United States Patent
Gutmann et al.

(10) Patent No.: US 12,496,639 B2
(45) Date of Patent: Dec. 16, 2025

(54) PLANNING DEVICE, MANUFACTURING DEVICE, METHOD AND COMPUTER PROGRAM PRODUCT FOR THE ADDITIVE MANUFACTURE OF COMPONENTS FROM A POWDER MATERIAL

(71) Applicant: TRUMPF Laser-und Systemtechnik GmbH, Ditzingen (DE)

(72) Inventors: Bernhard Gutmann, Pfaffenhofen a.d. Glonn (DE); Wilhelm Meiners, Aachen (DE); Sarah Leuck, Ludwigsburg (DE); Stefan Findeisen, Freiberg am Neckar (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 399 days.

(21) Appl. No.: 18/170,568

(22) Filed: Feb. 17, 2023

(65) Prior Publication Data
US 2023/0191497 A1    Jun. 22, 2023

Related U.S. Application Data

(63) Continuation of application No. PCT/EP2021/072968, filed on Aug. 18, 2021.

(30) Foreign Application Priority Data

Aug. 21, 2020   (DE) .................... 10 2020 210 681.9

(51) Int. Cl.
*B22F 12/90* (2021.01)
*B22F 10/36* (2021.01)
(Continued)

(52) U.S. Cl.
CPC .............. *B22F 12/90* (2021.01); *B22F 10/36* (2021.01); *B22F 12/41* (2021.01); *B22F 12/49* (2021.01); *B33Y 10/00* (2014.12); *B33Y 30/00* (2014.12)

(58) Field of Classification Search
CPC .......... B22F 12/90; B22F 10/36; B22F 12/41; B22F 12/49; B22F 10/28; B22F 10/366;
(Continued)

(56) References Cited

U.S. PATENT DOCUMENTS

| 5,130,064 A | 7/1992 | Smalley et al. |
| 2003/0127436 A1 | 7/2003 | Darrah et al. |

(Continued)

FOREIGN PATENT DOCUMENTS

| CN | 105710370 B | 4/2018 |
| CN | 105773967 B | 4/2018 |

(Continued)

OTHER PUBLICATIONS

Özel Tugrul et al, "Surface topography investigations on nickel alloy 625 fabricated via laser powder bed fusion," The International Journal of Advanced Manufacturing Technology, Oct. 2017, pp. 4451-4458, vol. 94, No. 9, Springer, London, United Kingdom.

*Primary Examiner* — Michael J Brown
(74) *Attorney, Agent, or Firm* — LEYDIG, VOIT & MAYER, LTD.

(57) ABSTRACT

A method for planning locally selective irradiation of a working region with an energy beam in order to produce a component from a powder material arranged in the working region includes defining an origin on a component contour of a component layer to be generated on a powder material layer in the working region, and overlaying the component contour, based on the origin, with an arrangement of irradiation regions to be irradiated with the energy beam. Each (Continued)

irradiation region has a dimension that is predetermined independently of the component contour and identical for all irradiation regions.

13 Claims, 3 Drawing Sheets

(51) Int. Cl.
*B22F 12/41* (2021.01)
*B22F 12/49* (2021.01)
*B33Y 10/00* (2015.01)
*B22F 10/28* (2021.01)
*B29C 64/393* (2017.01)
*B33Y 30/00* (2015.01)

(58) Field of Classification Search
CPC ......... B33Y 10/00; B33Y 30/00; B33Y 50/02; Y02P 10/25; B29C 64/153; B29C 64/393
USPC .......................................................... 700/97
See application file for complete search history.

(56) References Cited

U.S. PATENT DOCUMENTS

| | | |
|---|---|---|
| 2017/0173737 A1 | 6/2017 | Gray |
| 2018/0257140 A1 | 9/2018 | Pontiller-Schymura et al. |
| 2019/0033832 A1* | 1/2019 | Clement .............. G05B 19/408 |
| 2020/0023578 A1 | 1/2020 | Edelhaeuser et al. |
| 2020/0038992 A1 | 2/2020 | Mochida |
| 2020/0038999 A1 | 2/2020 | Mochida |
| 2020/0039147 A1 | 2/2020 | Mochida |
| 2020/0238623 A1 | 7/2020 | Umang et al. |
| 2020/0290286 A1* | 9/2020 | Jiang ..................... B29C 64/245 |
| 2021/0023620 A1 | 1/2021 | Herzog |
| 2021/0079796 A1 | 3/2021 | Geisen |
| 2022/0193769 A1 | 6/2022 | Hoppe et al. |

FOREIGN PATENT DOCUMENTS

| | | |
|---|---|---|
| CN | 107876766 A | 4/2018 |
| CN | 109047759 A | 12/2018 |
| CN | 109571945 A | 4/2019 |
| CN | 111203536 A | 5/2020 |
| DE | 102013017792 A1 | 4/2015 |
| DE | 102017105056 A1 | 9/2018 |
| DE | 102017207264 A1 | 10/2018 |
| DE | 102017127148 A1 | 5/2019 |
| DE | 102018203233 A1 | 9/2019 |
| DE | 102019211417 A1 | 2/2020 |
| DE | 102019211486 A1 | 2/2020 |
| DE | 102019211487 A1 | 2/2020 |
| EP | 2926925 A2 | 10/2015 |
| EP | 3115182 A1 | 1/2017 |
| EP | 3520929 A1 | 8/2019 |
| WO | WO 2020178216 A1 | 9/2020 |

* cited by examiner

PLANNING DEVICE, MANUFACTURING DEVICE, METHOD AND COMPUTER PROGRAM PRODUCT FOR THE ADDITIVE MANUFACTURE OF COMPONENTS FROM A POWDER MATERIAL

CROSS REFERENCE TO RELATED APPLICATIONS

This application is a continuation of International Application No. PCT/EP2021/072968 (WO 2022/038200 A1), filed on Aug. 18, 2021, and claims benefit to German Patent Application No. DE 10 2020 210 681.9, filed on Aug. 21, 2020. The aforementioned applications are hereby incorporated by reference herein.

FIELD

Embodiments of the present invention relate to a planning device and to a method for planning locally selective irradiation of a working region with an energy beam, to a computer program product for performing such a method, and to a manufacturing device and to a method for the additive manufacture of components from a powder material.

BACKGROUND

During the additive manufacture of components from a powder material, an energy beam is typically displaced selectively to predetermined irradiation positions of a working region in order to locally solidify powder material arranged in the working region. In particular, this is repeated layer-by-layer in powder material layers successively arranged in the working region in order to ultimately obtain a three-dimensional component made of solidified powder material.

The locally selective irradiation of the working region is planned in advance or else ad hoc during manufacture, but before the current irradiation. For this purpose, provision is made for a planning device that performs this planning based on a component contour of a component layer to be generated on a powder material layer in the working region. According to one conventional process, in this case a closed geometric shape, for example a rectangle, is first of all placed around all contour sections belonging to the component within the powder material layer, with a point being defined on an edge line of this geometric shape, in particular a corner or another point, as fixed origin. The geometric shape is then overlaid with a pattern of predetermined irradiation regions, in particular strips with a determined width. One problem here is that an unnecessarily large number of irradiation vectors may possibly be generated, with in particular a large number of shortened irradiation vectors being generated. This reduces productivity in two ways: Firstly due just to the sheer number of irradiation vectors that in particular have to be worked through in sequence; but secondly due to additional waiting times that have to be introduced into the regions of shortened irradiation vectors in order to avoid overheating of the powder material.

CN 111203536 A discloses a method in which a predefined component contour is overlaid with strip-shaped irradiation regions of the same width such that the component contour is always in contact with boundaries of the irradiation regions at outer corners or edges. This leads, in a disadvantageous manner, to the width of the strip-shaped irradiation regions not being able to be selected in a constant and in particular optimized manner with regard to at least one irradiation parameter, since it is dependent on the component contour specifically to be irradiated.

SUMMARY

Embodiments of the present invention provide a method for planning locally selective irradiation of a working region with an energy beam in order to produce a component from a powder material arranged in the working region. The method includes defining an origin on a component contour of a component layer to be generated on a powder material layer in the working region, and overlaying the component contour, based on the origin, with an arrangement of irradiation regions to be irradiated with the energy beam. Each irradiation region has a dimension that is predetermined independently of the component contour and identical for all irradiation regions.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
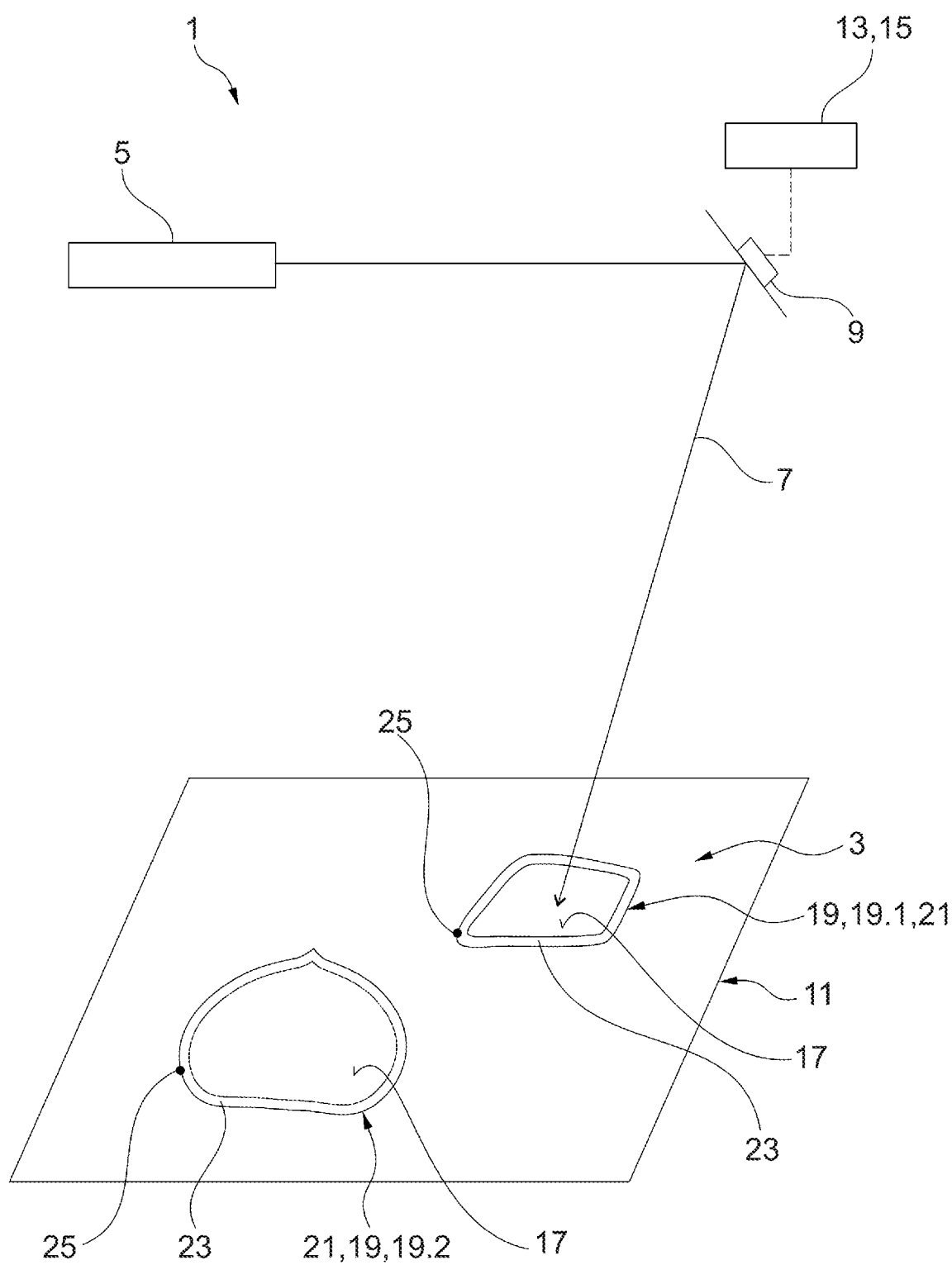
FIG. 1 shows an exemplary embodiment of a manufacturing device for the additive manufacture of components from a powder material.

Embodiments of the present invention provide a planning device and a method for planning locally selective irradiation of a working region, a computer program product configured for this purpose, and a manufacturing device and a method for the additive manufacture of components from a powder material.

In particular, embodiments of the present invention provide a planning device for planning locally selective irradiation of a working region with an energy beam, wherein the planning device is configured to obtain a component contour of a component layer to be generated on a powder material layer in the working region, to define an origin on the component contour, and to overlay the component contour, based on the origin, with an arrangement of irradiation regions to be irradiated with the energy beam, wherein each irradiation region has at least one dimension that is predetermined independently of the component contour and identical for all irradiation regions. This makes it possible, on the one hand, to avoid generating an excessively large number of irradiation vectors, since the origin for the generation of the irradiation regions is able to be selected, in a suitable manner, directly on the component contour. This process makes it possible, on the other hand, where possible, to avoid generating a large number of shortened vectors, not least as a result of which waiting times are also reduced. The productivity of the production of the component may thus be increased as a whole. Since in the process each irradiation region is assigned a predetermined identical dimension independent of the component contour, this may advantageously be optimized with regard to at least one irradiation parameter, such that in this regard in particular the component quality is able to be increased—without restrictions in terms of productivity.

Since the planning device is configured to overlay the component contour with the irradiation regions to be irradiated, the planning device is configured in particular to plan a temporal order of the irradiation of the working region with the energy beam. The individual irradiation regions are specifically preferably passed over in sequence with the energy beam—or else a plurality of energy beams—such that, at the same time, a temporal order of the irradiation is also linked to the definition of the irradiation regions. The irradiation regions are in particular irradiated in temporal succession with the energy beam or else a plurality of energy beams. This does not rule out a temporal overlap being able to occur when irradiating individual pairs or groups of irradiation regions, in particular when using multiple energy beams.

A component layer is understood here to mean a layer of the resulting component that is still to be generated or has already been generated in the working region in the powder material layer arranged there, that is to say in particular—after the powder material layer has finished being irradiated—those regions thereof in which the powder material has been solidified by the energy beam, in particular sintered or melted. In the course of the additive manufacturing method, the component is built up successively component layer by component layer from the powder material layers arranged above one another.

A component contour is understood here to mean an in particular closed border line of the component layer or of a region of the component layer. If the component layer has a plurality of island sections as defined in more detail below, each island section is assigned a separate component contour, specifically an in particular closed border line. The origin is thus defined in particular on a border line or boundary line, this separating a powder region that is solidified as intended after the powder material layer has finished being irradiated, that is to say a component section, from a region containing unsolidified powder, that is to say a powder region. For simpler illustration, use is made below of the terms "component section" for such a region of powder that is still to be solidified or has already been solidified and "powder region" for a region of powder that is not intended to be solidified on a powder material layer.

The fact that the planning device is configured to obtain the component contour in particular includes the fact that the planning device has an interface or a configuration that is suitable in some other way for having the component contour transmitted to it or for receiving the component contour—preferably electronically, in particular in the form of a file or other machine-readable data, in particular in a wireless or wired manner. However, it also includes the planning device being configured to create the component contour. It is possible in particular for a computer program to be able to run on the planning device itself, the computer program being able to design the component contour or generate it in some other way. It is also possible for the component contour to be input into the planning device by a user, whether manually, through speech input, through gestures or in another suitable manner. The fact that the planning device is configured to obtain the component contour accordingly means in particular that the component contour may be made available or accessible to the planning device in any way, this including the component contour being generated in the planning device itself.

The fact that the component contour is overlaid with the arrangement of the irradiation regions means in particular that the component contour is completely covered, in particular paved, with the irradiation regions, in particular such that no region of the component contour remains free. On the contrary, each region of the component contour is assigned to an irradiation region or covered by an irradiation region. However, it is possible for the irradiation regions to project beyond the component contour in regions due to their shape and/or extent. In this case, the component contour forms a boundary line for the actual irradiation of the working region with the energy beam. The irradiation takes place only within the component contour and on the component contour, but not outside the component contour. Sections of irradiation regions that project beyond the component contour are accordingly not taken into consideration or blocked during the actual irradiation.

The origin forms in particular a coordinate origin for the arrangement of the irradiation regions, and/or a starting point for the creation of a first irradiation region, based on which the further irradiation regions are then formed in accordance with a predetermined formation rule, in particular adjoining the first irradiation region.

Only a single origin is in particular defined on the component contour for each component contour. The selection of the origin and the subsequent generation of the irradiation regions is thus unambiguous for the respective component contour, with preferably, in particular at the same time as the origin, a predetermined orientation, in particular angular orientation relative to a predetermined coordinate axis, also being defined on the working region for the irradiation regions.

Additive or generative manufacture or production of a component is understood to mean in particular building up a component from powder material layer by layer, in particular a powder-bed-based method for producing a component in a powder bed, in particular a manufacturing method selected from a group consisting of selective laser sintering, laser metal fusion (LMF), direct metal laser melting (DMLM), laser net shaping manufacturing (LNSM), and laser engineered net shaping (LENS). Accordingly, the manufacturing device is configured in particular to perform at least one of the abovementioned additive or generative manufacturing methods.

In general, an energy beam is understood to mean directed radiation that is able to transport energy. In general, this may be particle radiation or wave radiation. In particular, the energy beam propagates through physical space along a propagation direction and transports energy along its propagation direction in the process. In particular, local deposition of energy in the working region is possible by way of the energy beam.

In some embodiments, the energy beam is an optical working beam. An optical working beam is understood to mean in particular directed, either continuous or pulsed, electromagnetic radiation which, in terms of its wavelength or a wavelength range, is suitable for additive or generative manufacturing of a component from powder material, in particular for sintering or melting the powder material. An optical working beam is understood to mean in particular a laser beam that is able to be generated continuously or in pulsed fashion. The optical working beam preferably has a wavelength or a wavelength range within the visible electromagnetic spectrum or within the infrared electromagnetic spectrum or within the overlap range between the infrared range and the visible range of the electromagnetic spectrum.

A working region is understood to mean in particular a region, in particular a plane or surface, in which the powder material is arranged and is locally irradiated with the energy beam to locally solidify the powder material. The powder material is in particular arranged sequentially in layers in the working region and irradiated locally with the energy beam in order to produce a component layer by layer.

The fact that the energy beam acts locally on the working region means in particular that the energy beam does not act on the entire working region globally—neither instantaneously nor sequentially—but rather that the energy beam acts on the working region at certain locations, in particular at individual locations that are contiguous or separate from one another, wherein the energy beam is in particular displaced within the working region by way of the scanner device. The fact that the energy beam acts selectively on the working region means in particular that the energy beam acts on the working region at selected, predetermined locations or places or in selected, predetermined regions. The working region is in particular a powder material layer or a preferably contiguous area of a powder material layer that the energy beam is able to reach with the aid of the scanner device, that is to say it comprises in particular locations, places or regions of the powder material layer on which the energy beam is able to act.

According to some embodiments, provision is made for the planning device to be configured to use, as predetermined dimension, a dimension that is adjusted, preferably optimized, to at least one irradiation parameter for the irradiation of the working region with the energy beam. This makes it possible to ensure a high component quality without restrictions in terms of productivity. The at least one irradiation parameter is preferably selected from a group consisting of: A length of an irradiation vector, an orientation and/or direction of an irradiation vector, a temporal irradiation duration, a displacement speed of the energy beam, an intensity of the energy beam, and a size and/or shape of the energy beam on the working region.

An irradiation vector is understood to mean in particular a continuous linear displacement of the energy beam within an irradiation region over a particular path with a particular displacement direction, in particular in the width direction of an irradiation region in the form of strips. The irradiation vector thus includes the direction or orientation of the displacement. The irradiation vector preferably extends along the entire width of the strip-shaped irradiation region. The width of the irradiation region thus preferably defines the length of the irradiation vector. An irradiation region is in particular passed over sequentially with a multiplicity of irradiation vectors. In particular, a strip-shaped irradiation region is preferably passed over sequentially with a multiplicity of irradiation vectors that are oriented in the width direction and offset from one another or arranged next to one another in the longitudinal direction of the irradiation region. In this case, adjacent irradiation vectors may in particular be oriented parallel or antiparallel to one another.

The fact that the displacement takes place continuously means in particular that it takes place without stopping or interrupting the energy beam, in particular without any jumps. The fact that the irradiation takes place linearly means in particular that it takes place along a straight line.

According to some embodiments, provision is made for the planning device to be configured to generate the arrangement of the irradiation regions based on the origin such that the irradiation regions adjoin one another. The component contour is thus overlaid with the irradiation regions in particular without any gaps. It is possible for the irradiation regions to adjoin one another without any overlap. In this case, it is advantageously possible to avoid seam formation and dual irradiation of particular regions. However, it is also possible for the irradiation regions to overlap one another at least in regions.

According to some embodiments, provision is made for the planning device to be configured to generate the irradiation regions in the form of strips, that is to say to generate strip-shaped irradiation regions. This configuration has proved to be particularly advantageous for high-quality and at the same time productive manufacture of components. The strips or strip-shaped irradiation regions are preferably oriented parallel to one another. The strips preferably adjoin one another, particularly preferably without overlapping; however, an overlap is also possible at least in regions.

The predetermined dimension is preferably a width of the strips. A width is understood here to mean in particular a dimension that extends perpendicular to a longest extent of the respective strip, that is to say perpendicular to the longitudinal direction of the strip. In this case, a strip is defined in particular by virtue of it having, toward the working region, a larger dimension than in the other direction orthogonal thereto. The direction of the larger dimension is referred to as longitudinal direction, and the direction of smaller dimension and orthogonal thereto is referred to as width direction. The extent or dimension along the longitudinal direction is referred to as length; the extent or dimension along the width direction is referred to as width.

According to some embodiments, provision is made for the planning device to be configured to perform the planning of the irradiation for a plurality of powder material layers to be irradiated in particular sequentially in succession, to obtain an assigned component contour for each powder material layer of the plurality of powder material layers, and to define the origin for at least one, preferably for each, powder material layer of the powder material layers following a previous powder material layer on the assigned component contour at a different location than for the previous powder material layer. This advantageously makes it possible to increase the quality of the resulting component, since identical irradiation of—in particular directly—mutually adjacent powder material layers is avoided. The position of the origin on the component contour thus preferably changes from powder material layer to powder material layer.

According to some embodiments, provision is made for the planning device to be configured to select an orientation of the irradiation regions for at least one, preferably for each following powder material layer differently than for the previous powder material layer. An orientation is in this case understood to mean an angle formed by a particular direction, in particular longitudinal direction, of an irradiation region and a predetermined axis on the working region. If the irradiation regions are in the form of strips, the orientation is in particular an angle formed by the longitudinal direction of the irradiation regions, preferably parallel to one another, and a predetermined axis on the working region. Changing the orientation of the working regions from the previous powder material layer to the following powder material layer, in particular from powder material layer to powder material layer, avoids identically oriented irradiation of—in particular directly—adjacent powder material layers, which in turn increases component quality. The strip-shaped irradiation regions of two successive arrangements in particular preferably form a finite angle, in particular other than 0° and 180°, with one another.

According to some embodiments, the orientation of the irradiation regions is rotated by a predetermined angle from powder material layer to powder material layer. However, it is preferably checked in the process whether the instantaneous angle is within a forbidden angle range; if this is the case, the angle is discarded and another angle is selected, for example by performing another rotation by the predetermined angle.

According to some embodiments, provision is made for the planning device to be configured to select, for each island section, a separate origin on the component contour of the respective island section when the component layer has a plurality of island sections. This particularly advantageously makes it possible to avoid generating an unnecessarily large number of short irradiation vectors, since in particular smaller island sections are advantageously overlaid with only a single irradiation region. This is in particular possible depending on the size of the island section under consideration since each island section obtains a separate origin, which is preferably able to be defined in a suitable manner on the respective component contour so as in particular to allow, depending on the shape of the island section, the overlaying thereof with as few irradiation regions as possible, in particular preferably with a single irradiation region. When the origin is defined outside the component contour of an island section, this on the other hand gives rise to the problem that even island sections that are smaller in all directions than an irradiation region are often encompassed by more than one irradiation region or are intersected by a boundary line between adjacent irradiation regions. This then leads in particular to unnecessarily short irradiation vectors in the respective irradiation regions.

An island section is understood to mean in particular a component section of the component to be manufactured that is intended to be separated, after a powder material layer has finished being irradiated, from other component sections within the same powder material layer around its entire circumference by unsolidified powder material. An island section of the component thus has, within its assigned powder material layer, no connection path whatsoever made of solidified powder material to any other component section of the same powder material layer.

The planning device is preferably selected from a group consisting of a computer, in particular a personal computer (PC), a plug-in card or control card, and an FPGA board. In some embodiments, the planning device is an RTC6 control card from SCANLAB GmbH, in particular in the current configuration obtainable on the priority date of the present property right.

According to some embodiments, provision is made for the planning device to be configured to generate the arrangement of the irradiation regions based on the origin, in particular in each case for each individual origin, such that an irradiation region boundary passing through the origin only makes contact with the component contour. This makes it possible in particular to reduce the number of irradiation vectors, very particularly the number of shortened irradiation vectors.

In particular, the arrangement of the irradiation regions is preferably generated such that the irradiation region boundary passing through the origin does not intersect the component contour. This in particular avoids the irradiation region boundary passing through the origin dividing the component contour into different sub-regions, which would often lead, in particular close to the component contour as border line, to shortened irradiation vectors. The irradiation region boundary passing through the origin is therefore in particular selected such that it is tangent to the component contour or—depending on the design of the component contour—is coincident with the component contour in regions.

An irradiation region boundary passing through the origin is understood to mean in particular that boundary line of an irradiation region or between two irradiation regions of the arrangement on which the origin lies, and which thus passes through the origin.

In particular, the planning device is preferably configured to generate the arrangement of the irradiation regions based on the origin, in particular in each case for each individual origin, such that irradiation regions adjoining the origin—in particular on both sides of the origin—of the arrangement are only in contact with the component contour along their boundary.

Embodiments of the present invention provide a manufacturing device for the additive manufacture of components from a powder material, having a beam generation device that is configured to generate an energy beam. The manufacturing device additionally has a scanner device that is configured to locally and selectively irradiate a working region with the energy beam in order to produce a component from the powder material arranged in the working region by way of the energy beam. The manufacturing device furthermore has a control device that is operatively connected to the scanner device and is configured to drive the scanner device. The control device in this case has a planning device according to embodiments of the invention or a planning device according to the embodiments described above. As an alternative, the control device is designed as a planning device according to embodiments of the invention or as a planning device according to the embodiments described above. In particular the advantages that have already been explained in connection with the planning device are afforded in connection with the manufacturing device.

The scanner device preferably has at least one scanner, in particular a galvanometer scanner, a piezo scanner, a polygon scanner, an MEMS scanner, and/or a working head or treatment head able to be displaced relative to the working region. The scanner devices proposed here are especially suitable for displacing the energy beam between a plurality of irradiation positions within the working region.

A working head or treatment head that is able to be displaced relative to the working region is understood here to mean in particular an integrated component of the manufacturing device that has at least one radiation outlet for at least one energy beam, wherein the integrated component, that is to say the working head, as a whole is able to be displaced along at least one displacement direction, preferably along two mutually perpendicular displacement directions, relative to the working region. Such a working head may in particular be embodied with a gantry design or be guided by a robot. The working head may in particular be designed as a robot hand of a robot.

The control device is preferably selected from a group consisting of a computer, in particular a personal computer (PC), a plug-in card or control card, and an FPGA board. In one preferred configuration, the control device is an RTC6 control card from SCANLAB GmbH, in particular in the current configuration obtainable on the priority date of the present property right.

The beam generation device is preferably designed as a laser. The energy beam is thus advantageously produced as an intensive beam of coherent electromagnetic radiation, in particular coherent light. In this respect, irradiation preferably means exposure.

The manufacturing device is preferably configured for selective laser sintering. As an alternative or in addition, the manufacturing device is configured for selective laser melting. These configurations of the manufacturing device have proved to be particularly advantageous.

Embodiments of the present invention provide a method for planning locally selective irradiation of a working region with an energy beam in order to produce a component from a powder material arranged in the working region by way of the energy beam. In the course of the method, an origin is defined on a component contour of a component layer to be generated on a powder material layer in the working region. The component contour, based on the origin, is overlaid with an arrangement of irradiation regions to be irradiated with the energy beam and having a dimension that is predetermined independently of the component contour and identical for all irradiation regions. In particular the advantages that have already been explained in connection with the planning device are afforded in connection with the method.

Use is preferably made, as the predetermined dimension, of a dimension that is adjusted, preferably optimized, to at least one irradiation parameter for the irradiation of the working region with the energy beam.

The arrangement of the irradiation regions is preferably generated based on the origin such that the irradiation regions adjoin one another.

The irradiation regions are preferably generated in the form of in particular mutually adjoining, in particular parallel strips, wherein the predetermined dimension is preferably a width of the strips.

The planning of the irradiation is preferably performed for a plurality of powder material layers to be irradiated in particular sequentially in succession, wherein an assigned component contour is obtained for each powder material layer of the plurality of powder material layers, and wherein the origin is defined for at least one, preferably for each, powder material layer of the powder material layers following a previous powder material layer on the assigned component contour at a different location than for the previous powder material layer.

An orientation of the irradiation regions for at least one, preferably for each following powder material layer is preferably selected differently than for the previous powder material layer.

For each island section, a separate origin is preferably selected on the component contour of the respective island section when the component layer has a plurality of island sections.

According to some embodiments, provision is made for the arrangement of the irradiation regions to be generated based on the origin such that an irradiation region boundary passing through the origin only makes contact with the component contour.

The arrangement of the irradiation regions is in particular generated based on the origin such that the two irradiation regions adjoining the origin only make contact with the component contour along their boundary.

The method in particular comprises at least one method step that has already been explained in connection with the planning device.

Embodiments of the present invention provide a computer program product that contains machine-readable instructions based on which a method according to embodiments of the invention or a method according to the embodiments described above is performed on a computing device, in particular a planning device or a control device, when the computer program product runs on the computing device. In particular the advantages that have already been explained in connection with the planning device are afforded in connection with the computer program product.

Embodiments of the present invention provide a method for the additive manufacture of a component from a powder material, in which a manufacturing device according to embodiments of the invention or a manufacturing device according to the embodiments described above is used. In this case, a working region is irradiated locally and selectively with the energy beam in order to produce the component from the powder material arranged in the working region by way of the energy beam. The irradiation is then performed in the irradiation regions determined by the planning device. In particular the advantages that have already been explained in connection with the planning device are afforded in connection with the method.

The irradiation regions are preferably first generated by the planning device, in particular including the irradiation vectors, and the working region is then irradiated, in particular exposed, with the energy beam on the basis of the generated irradiation regions, in particular on the basis of the irradiation vectors.

A laser is preferably used as beam generation device.

The component is preferably manufactured by way of selective laser sintering and/or selective laser melting.

A metal or ceramic powder may in particular preferably be used as powder material.

This in particular results, according to the present technical teaching, in a reduced file size for a file that explicitly or implicitly comprises the arrangement of the irradiation regions, wherein the file may in particular comprise instructions for irradiating the working region and/or for manufacturing the component, since a reduced number of irradiation vectors is able to be generated in comparison with conventional processes. This also results in fewer starting and/or end points and thus increased productivity. This also results in smaller variations in the length of the irradiation vectors, meaning that it is possible to perform a more homogeneous process, in particular including without waiting times or with considerably reduced waiting times. Seams are reduced or completely avoided in particular for small island sections, such that no overlap regions susceptible to defects, or in any case a reduced number of overlap regions susceptible to defects, are present in the manufactured component.

FIG. 1 shows an exemplary embodiment of a manufacturing device 1 for the additive manufacture of a component 3 from a powder material. The manufacturing device 1 has a beam generation device 5 that is configured to generate an energy beam 7. The beam generation device 5 is preferably configured as a laser, and the energy beam 7 is accordingly a laser beam.

The manufacturing device 1 additionally has a scanner device 9 that is configured to locally and selectively irradiate a working region 11 with the energy beam 7 in order to produce the component 3 from the powder material arranged in the working region 11 by way of the energy beam 7. The manufacturing device 1 furthermore has a control device 13 that is operatively connected to the scanner device 9 and is configured to drive the scanner device 9, in particular in order to displace the energy beam 7 within the working region 11.

The control device 13 is designed here as planning device 15. As an alternative, it is possible for the control device 13 to have a planning device 15.

The planning device 15 is configured to plan the locally selective irradiation of the working region 11 with the energy beam 7.

A component layer 17 illustrated in FIG. 1 and that is intended to be generated in the working region 11 by way of the energy beam 7 has two component sections 19, specifically a first component section 19.1 and a second component section 19.2, with each of the component sections 19 being designed here as an island section 21. The component sections 19.1, 19.2 are each surrounded around their entire circumference by unsolidified powder material after the component layer 17 has been finished and have in particular no connection path made of solidified powder material to one another or to any other component sections 19. Each component section 19 is assigned a component contour 23 in the form of a border line or boundary line.

The planning device 15 is configured to obtain the component contour 23 and to define a respective origin 25 on the respective component contour 19. The planning device 15 is furthermore configured to overlay the component contour 23, based on the origin 25, with an arrangement 26 of irradiation regions 27 to be irradiated with the energy beam 7 (see FIG. 2).

Figure 2:
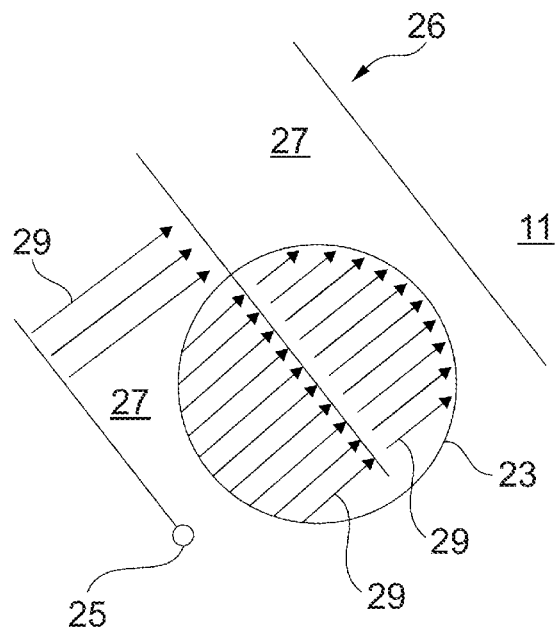
FIG. 2 shows a schematic illustration of one example of a method for planning locally selective irradiation of a working region.

FIG. 2 shows a schematic illustration of one example of a method for planning locally selective irradiation of the working region 11 according to the prior art. In this case, the origin 25 is selected outside the component contour 23, and the component contour 23 is then overlaid with the irradiation regions 27, wherein the irradiation regions 27, which are strip-shaped here, have a predetermined dimension identical for all irradiation regions 27, here in particular an identical width. In order to form the component layer 17, the irradiation regions 27 are passed over with irradiation vectors 29 that are preferably oriented in the width direction of the irradiation regions 27 and arranged next to and offset from one another along a length of the irradiation regions 27. In particular since the origin 25 is arranged outside the component contour 23, this gives rise to a high risk—as illustrated here—of an unnecessarily large number of irradiation vectors 29 being generated, with furthermore a large number of shortened irradiation vectors 29 in comparison with the width of the irradiation regions 27 being generated, this in particular having a negative effect on the productivity of the production method.

The working region 11 is actually irradiated only within the component contour 23. The irradiation vectors 29 illustrated outside the component contour 23 serve only to illustrate the basic configuration of the irradiation regions 27. It also becomes clear here that an unshortened length of the irradiation vectors 29 in this case corresponds to the width of the irradiation regions 27.

Figure 3:
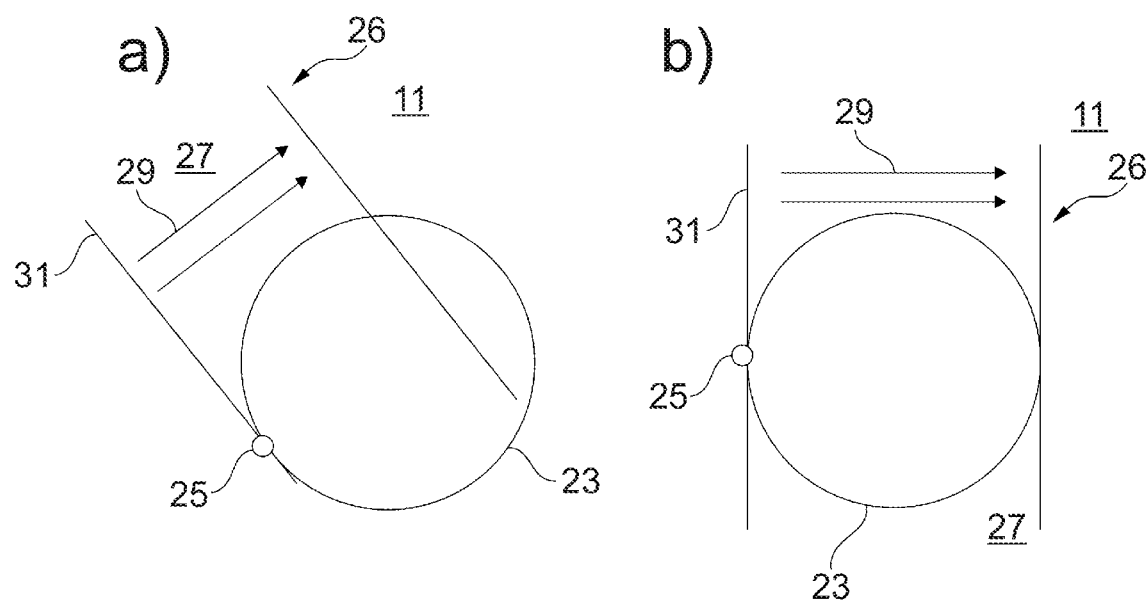
FIGS. 3*a* and 3*b* show a schematic illustration of a method for planning locally selective irradiation of a working region according to some embodiments.

FIG. 3 shows a schematic illustration of a first embodiment of a method for planning locally selective irradiation of the working region 11.

Elements that are the same or functionally the same are provided with the same reference signs in all of the figures, and so to this extent reference is respectively made to the foregoing description.

In the course of the method proposed here, the origin 25 is defined on the component contour 23, and then the component contour 23, based on the origin 25, is overlaid with the arrangement 26 of irradiation regions 27, wherein each irradiation region 27 has at least one dimension that is predetermined independently of the component contour 23 and identical for all irradiation regions 27, here in particular an identical width. In this case too, the irradiation regions 27 are preferably created in the form of strips. It becomes clear here with reference to FIG. 3 that, due to the definition of the origin 25 on the component contour 23, the number of generated irradiation vectors 29 as a whole, but in particular the number of shortened irradiation vectors 29 that are shorter than the width of an irradiation region 27, is able to be reduced. The productivity of the method is thereby high. At the same time, a predetermined dimension that is adjusted, preferably optimized, to at least one irradiation parameter for the irradiation of the working region 11 with the energy beam 7 is preferably used, such that the component quality is also high.

The arrangement of the irradiation regions 27 is in particular generated based on the origin 25 such that the irradiation regions 27 adjoin one another.

The irradiation regions 27 are in particular generated in the form of in particular mutually adjacent, preferably parallel strips. The predetermined dimension is in this case in particular a width of the strips.

The planning device 15 is preferably configured to perform the planning of the irradiation for a plurality of powder material layers to be irradiated in particular sequentially in succession. An assigned component contour 23 is obtained for each powder material layer of the plurality of powder material layers, and the origin 25 is preferably defined for each powder material layer of the powder material layers following a previous powder material layer on the assigned component contour 23 at a different location than for the respective previous powder material layer. An orientation of the irradiation regions 27 for each following powder material layer is also preferably at the same time selected differently than for the previous powder material layer.

In this respect, in FIG. 3, a) shows a previous powder material layer and b) shows a following powder material layer, wherein, for the following powder material layer in b), both the location of the origin 25 and the orientation of the irradiation regions 27 are selected differently than for the previous powder material layer in a).

It also becomes clear with reference to FIG. 3 that the arrangement 26 of the irradiation regions 27 based on the origin 25 is preferably generated such that an irradiation region boundary 31 passing through the origin 25 only makes contact with the component contour 23, and in particular does not intersect it. A number of shortened irradiation vectors 29 may be minimized in a particularly efficient manner in precisely this way, with at the same time the total number of irradiation vectors 29 also preferably being reduced.

Figure 4:
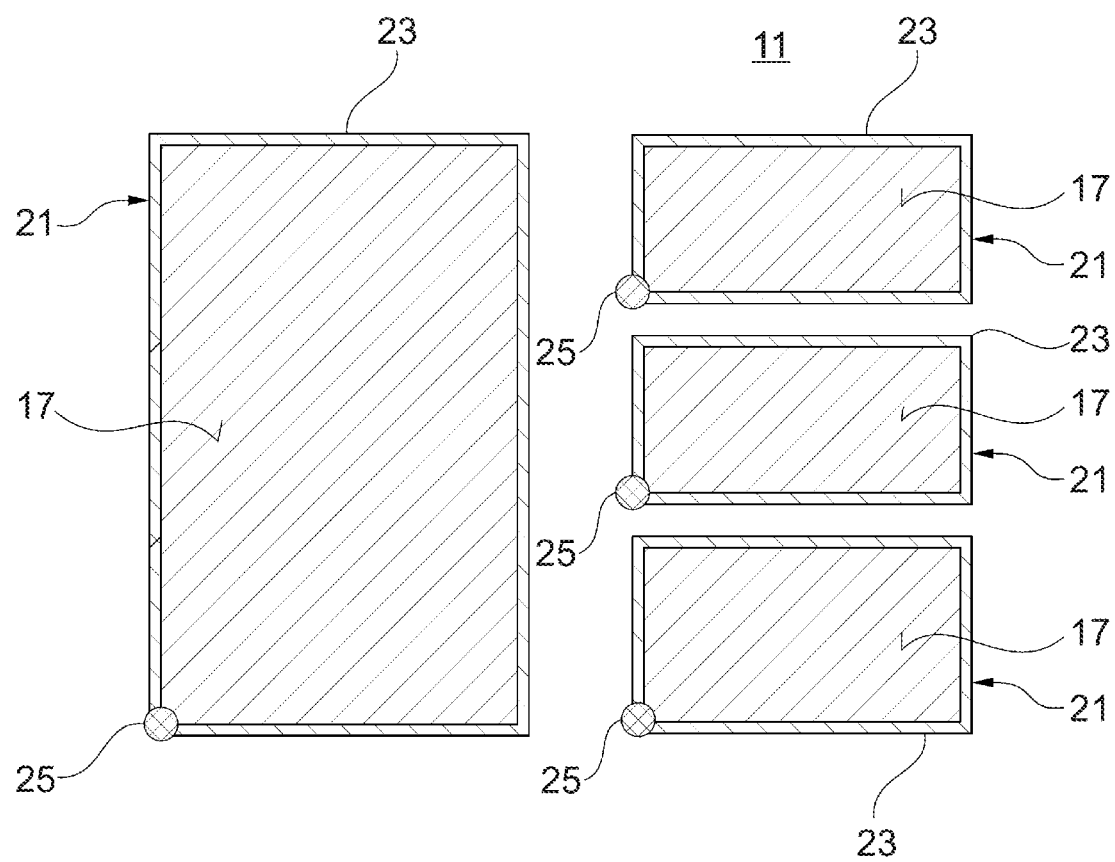
FIG. 4 shows a schematic illustration of a method for planning locally selective irradiation of a working region according to some embodiments.

FIG. 4 shows a schematic illustration of a second embodiment of a method for planning locally selective irradiation of the working region 11. In this case, the component layer 17 has a plurality of island sections 21, wherein, for each island section 21, a separate origin 25 on the component contour 23 of the respective island section 21 is selected. This in particular makes it possible to ensure that a smallest possible number of irradiation vectors 29, but in particular a smallest possible number of shortened irradiation vectors 29, is generated for each island section 21.

The method is preferably implemented in a computer program that contains machine-readable instructions based on which the method is performed on a computing device when the computer program runs on the computing device.

In the course of a method for the additive manufacture of a component 3 from the powder material by way of the manufacturing device 1, the irradiation is advantageously performed in the irradiation regions 27 determined by the planning device 15.

The irradiation regions 27 are in particular first generated by the planning device 15, in particular including the irradiation vectors 29, and the working region 11 is then irradiated, in particular exposed, with the energy beam 7 on the basis of the generated irradiation regions 27, in particular on the basis of the irradiation vectors 29.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A planning device for planning locally selective irradiation of a working region with an energy beam in order to produce a component from a powder material arranged in the working region, the planning device comprising a computing device, the computing device being configured to:
    obtain a component contour of a component layer to be generated on a powder material layer in the working region,
    define an origin for the component layer, the origin being positioned on the component contour, and
    overlay an arrangement of a plurality of irradiation regions on the component contour, wherein each of the plurality of irradiation regions has an identical width, a boundary of a first irradiation region of the plurality of irradiation regions passing though the origin, and wherein a portion of each irradiation region that is overlayed with the component contour is passed over with irradiation vectors oriented in a width direction for irradiating with the energy beam, the irradiation vectors having a maximum length equal to the width of irradiation regions, thereby minimizing a total number of irradiation vectors for increased productivity of producing the component.

2. The planning device as claimed in claim 1, wherein the computing device is configured to adjust the width of plurality of irradiation regions to at least one irradiation parameter for the irradiation of the working region with the energy beam.

3. The planning device as claimed in claim 1, wherein the computing device is configured to generate the arrangement of the plurality of irradiation regions such that the plurality of irradiation regions adjoin one another.

4. The planning device as claimed in claim 1, wherein the computing device is configured to generate the arrangement of the plurality of irradiation regions as mutually adjoining parallel strips.

5. The planning device as claimed in claim 1, wherein the computing device is configured to perform the planning the irradiation for a plurality of powder material layers to be irradiated sequentially in succession by:
    obtaining a respective component contour for each powder material layer of the plurality of powder material layers, and
    defining a respective origin for a respective powder material layer of the plurality of powder material layers on the respective component contour at a different location of the respective component contour than for a previous powder material layer.

6. The planning device as claimed in claim 1, wherein the computing device is configured to select an orientation of the irradiation regions for at least one following powder material layer differently than for a previous powder material layer.

7. The planning device as claimed in claim 1, wherein the component layer has a plurality of island sections, the computing device is further configured to, for each respective island section, select a separate origin on the component contour of the respective island section.

8. The planning device as claimed in claim 1, wherein the computing device is configured to generate the arrangement of the irradiation regions, such that, the boundary of the first irradiation region passing through the origin only makes contact with the component contour.

9. A manufacturing device for additive manufacture of components from a powder material, the manufacturing device comprising:
    a beam generation device configured to generate an energy beam,
    a scanner device configured to locally and selectively irradiate a working region with the energy beam in order to produce a component from the powder material arranged in the working region, and
    a control device operatively connected to the scanner device and configured to drive the scanner device, wherein the control device comprises a planning device as claimed in claim 1.

10. A method for additive manufacture of a component from a powder material using a manufacturing device as claimed in claim 9, wherein a working region is irradiated locally and selectively with the energy beam in order to produce the component from the powder material arranged in the working region, wherein the irradiation is performed in the irradiation regions determined by the planning device.

11. A method for planning locally selective irradiation of a working region with an energy beam in order to produce a component from a powder material arranged in the working region, the method comprising:
    obtaining a component contour of a component layer to be generated on a powder material layer in the working region defining an origin on the component contour of the component layer, and overlaying an arrangement of a plurality of irradiation regions on the component contour, wherein each of the plurality of irradiation regions has an identical width, a boundary of a first irradiation region of the plurality of irradiation regions passing though the origin, and wherein a portion of each irradiation region that is overlayed with the component contour is passed over with irradiation vectors oriented in a width direction for irradiating with the energy beam, the irradiation vectors having a maximum length equal to the width of irradiation regions, thereby minimizing a total number of irradiation vectors for increased productivity of producing the component.

12. The method as claimed in claim 11, further comprising generating the arrangement of the irradiation regions such that the boundary of the first irradiation region passing through the origin only makes contact with the component contour.

13. A non-transitory computer-readable medium having machine-readable instructions for performing a method as claimed in claim 11 on a computing device when the machine-readable instructions are executed on the computing device.

* * * * *